March 10, 1970      R. C. LANGLEY ET AL      3,499,265
APPARATUS FOR GAS SEPARATION
Filed March 1, 1968
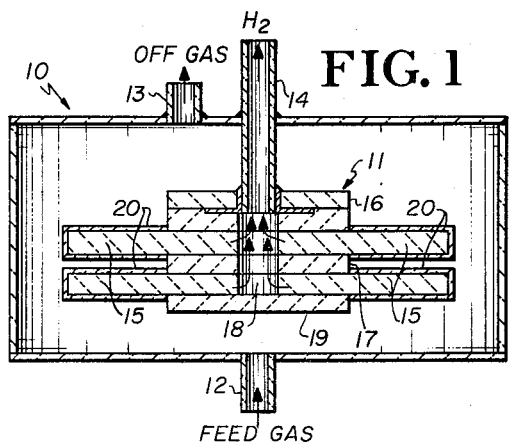
FIG. 1
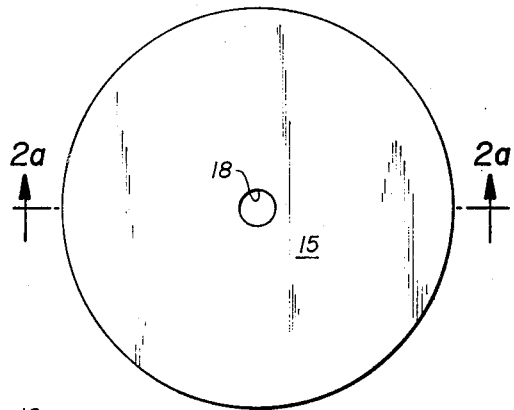
FIG. 2
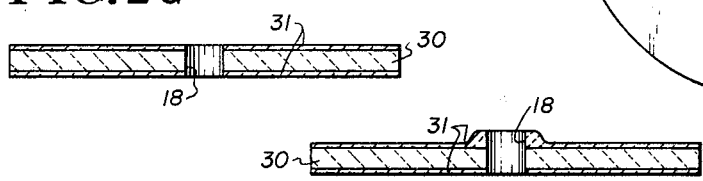
FIG. 2a
FIG. 2b
FIG. 2c
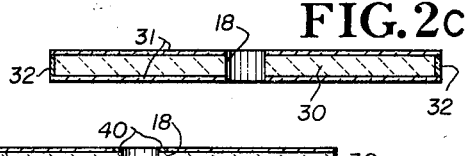
FIG. 3a
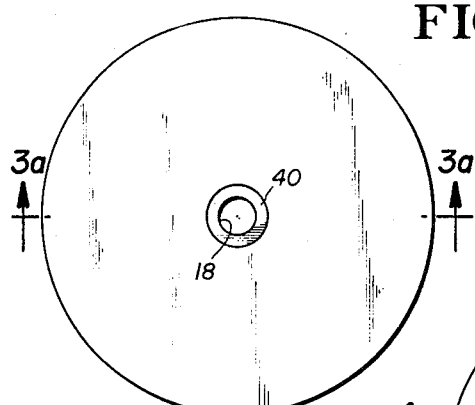
FIG. 3
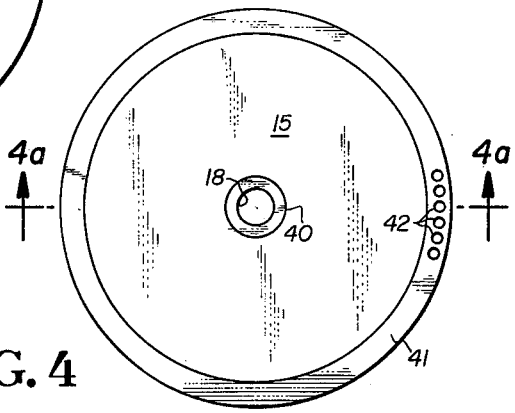
FIG. 4
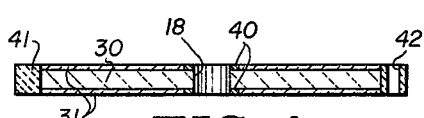
FIG. 4a
INVENTORS:
ROBERT C. LANGLEY
JOHN W. LINDENTHAL
HERBERT MYERS
HEINRICH K. SPRASCHIL
BY
ATTORNEY

United States Patent Office 3,499,265
Patented Mar. 10, 1970

3,499,265
APPARATUS FOR GAS SEPARATION
Robert C. Langley, Millington, John W. Lindenthal, Freehold, Herbert Myers, Newark, and Heinrich K. Straschil, East Orange, N.J., assignors to Engelhard Minerals & Chemicals Corporation, Newark, N.J., a corporation of Delaware
Filed Mar. 1, 1968, Ser. No. 709,615
Int. Cl. B01d 13/00
U.S. Cl. 55—158                                         3 Claims

ABSTRACT OF THE DISCLOSURE

Improvement in apparatus for the separation of hydrogen by diffusion through palladium containing films deposited on a ceramic support wherein the ceramic support is of laminated structure having a surface of fine porosity and an inner layer of coarse porosity to improve the structural strength of the support while permitting high gas flow through the support.

BACKGROUND OF THE INVENTION

The present invention relates to apparatus for separating a gas, such as hydrogen, from a mixture of gases by diffusion through a non-porous membrane composed of material through which the gas to be separated is selectively permeable.

Apparatus for separating hydrogen from gaseous mixtures and purifying hydrogen by permeation through thin non-porous metal barriers of palladium or palladium alloys is well known. A variety of techniques have been hitherto devised for effecting such separations. For example, it is known to use thin tubes of hydrogen-permeable metal as the barrier means, the hydrogen-containing gases being contacted with one side of such tubes and pure diffused hydrogen being removed from the other side. As an alternative to the use of thin metal tubes for diffusion separation of hydrogen, techniques have been devised which employ thin sheets or foils of hydrogen-permeable metal. In general, foil-type diffusers are assembled having one or more foils supported by a porous backing and sealed or gasketed around the peripheral edges of the foil to provide a leak-tight structure.

More recently, as a result of the operational difficulties encountered in using tube-type or foil-type diffusion units for hydrogen separation, diffusion units have been developed which employ a ceramic support for a thin diffusion film and wherein the diffusion film is supported in a manner such that the ceramic support and the complete diffusion assembly are subjected only to isostatic pressure. Such apparatus is disclosed and claimed in U.S. Patent 3,344,586, patented Oct. 3, 1967. The novel apparatus of that patent is capable of withstanding high pressures since ceramics in general are strong in compression, and no pressure other than isostatic pressure is actually asserted on the diffusion assembly. By employing a diffusion assembly of the patented design, and eliminating any requirement for application of pressure at the edges of the ceramic supports for gasketing or other purposes, forces in tension resulting in unequal stress which would crack the ceramic support are totally eliminated.

In accordance with the teachings of the aforesaid U.S. Patent, uniformly porous ceramic elements constitute the support for a thin metallic diffusion film. Further, in accordance with said patent, the porous ceramic supports may be provided with hollow interiors or vein-like channels to improve the radial flow of diffused gases to the pure gas outlet of the diffusion assembly. In practice, the use of a uniform porous ceramic body necessarily requires a compromise in desirable physical properties of the support. A highly porous body which favors diffusion normally has a rough surface which makes deposition of a smooth, uniform metallic coating difficult; whereas a smooth and uniform ceramic surface is characteristic of a reduced porosity body, which decreases the permeability of the ceramic body to diffused gases. The use of hollow or channelled ceramic bodies, while improving the rate of gas flow therethrough, introduces inherent structural weaknesses and the possibility of warping of the ceramic body as a result of uneven stresses in the ceramic on firing.

SUMMARY OF THE INVENTION

The present invention is an improvement in the apparatus of U.S. Patent 3,344,586, which patent is incorporated herein by reference, and has as one of its objects the provision of an apparatus of the aforementioned type wherein porous ceramic supports are provided which permit high radial and axial flow and which are attained with no sacrifice in strength. In accordance with the present invention, ceramic supports for hydrogen-permeable metal films are provided which are of monolithic design and of laminated structure which contribute to the high flow and strength of the ceramic and ensure good surface characteristics for support of the diffusion film. The term "laminated" as used herein means the ceramic supports have cores of coarse porosity and surfaces of fine porosity, i.e. distinct layers of different porosity adhered together, each of said layers being composed of ceramic grains and the granularity of the grains in each of said layers being in different ranges. The ceramic supports are "monolithic" in that each element or disk is made in a single firing.

FIGURE 1 is a side elevation in section of an illustrative embodiment of gas diffusion separation apparatus in accordance with the present invention.

FIGURES 2, 3 and 4 are plan views of porous ceramic elements employed in the apparatus of the present invention.

FIGURES 2a, 2b, 2c, 3a and 4a are sections of the elements shown in plan in FIGURES 2, 3 and 4.

Referring now to FIGURE 1, hydrogen diffusion separation apparatus in accordance with the invention comprises generally a chamber 10 having a gas diffusion assembly 11 supported therein. Impure feed gas containing hydrogen enters the chamber 10 through an inlet tube 12 shown fixed through the bottom wall of the chamber 10. The off gas from which hydrogen has been separated flows out of the chamber 10 through an outlet tube 13 shown secured through the top wall of the chamber.

The diffusion assembly 11 is a rigid body of ceramic material, a large portion of which is porous ceramic material with the exterior surfaces of the porous ceramic portions of the assembly 11 being coated with a thin surface coating of non-porous hydrogen-permeable material, such as palladium, or palladium-containing alloys. The ceramic diffusion assembly 11 is attached to a pure gas outlet tube 14 which is secured through the upper wall of the chamber 10.

The walls of the chamber 10, the inlet and outlet tubes 12 and 13, and the pure gas outlet conduit 14 are suitably made of stainless steel.

Diffusion assembly 11 is formed of one or more thin flat elements 15 of porous ceramic material secured to the pure gas outlet conduit 14 by a ceramic flange 16 e.g. in a manner as described in detail in U.S. Patent 3,367,696. As shown, more than one of the porous ceramic elements 15 may be provided, in which case, the plurality of elements 15 are arranged in a stack and are held spaced apart by a spacing member 17 between each adjacent pair of elements 15. Only one pair of elements 15 with an intermediate spacing member 17 is shown, but it will be appreciated that any desired number of elements 15 and spacing member 17 may be included in the stack.

The elements 15 are normally circular, but the particular shape is not restricted to round disks. For example, the elements may be square, rectangular, or generally polygonal, but, it is desirable that the diffusion elements have a minimum number of sharp corners. Similarly, the peripheral shape of the spacing member 17 is not critical, but the spacing member 17 is made to have a smaller circumference than the element 15 so that the outward portions of the elements 15 extend beyond the spacing member 17 in the nature of fins to provide large exterior surface areas. In one embodiment of the invention, spacer element 17 may be integral with element 15, e.g. in the form of a raised hub on the element 15.

The element 15 and the spacing member 17 each have a central bore therethrough and the elements and spacing member are axially arranged in the stack with their bores in line to provide an axial bore 18 within the stack. At the bottom of the stack, a gas impervious cap 19 is secured to the underside of the bottom element 15 to cover, and thus block, the lower end of the bore 18. At the upper end of the stack, the bore 18 opens through the flange 16 into the pure gas outlet conduit 14 so that the conduit is in gas flow communication with the bore.

The membrane through which hydrogen diffuses is provided by a thin film 20 consisting of a suitable gas-permeable material, such as palladium or an alloy of palladium, coated on the exposed external surfaces of the porous ceramic portions of the diffusion assembly 11.

In practice, for economy of manufacture and assembly, the ceramic elements 15 are ordinarily the only portions of the diffusion assembly 11 made of porous ceramic, and the other portions, namely the ceramic flange 16, spacing member 17 and cap 19, are normally made of non-porous ceramic material. It is to be understood, however, that the other ceramic portions of the assembly 11 may also be made of porous ceramic suitably coated on the exterior surfaces with a hydrogen-permeable film, without departing from the spirit or scope of the present invention.

In accordance with the present invention, the element 15 is a monolithic solid molded ceramic having a core of coarse porosity ceramic 30 sandwiched between layers of ceramic of fine porosity 31 as shown for example in FIGURE 2 and in cross section in FIGURES 2a, 2b and 2c. The disk may be employed with separate spacer elements 17 as shown in FIGURE 1, or spacer elements may be integral with the ceramic disk which will then assume the shape shown in FIGURE 2b. Alternatively, as shown in FIGURE 2c, the fine porosity ceramic layer 31 may extend around the entire circumference of the disk 15, for example as shown by rim 32. Such an embodiment is particularly preferred since the coarse porosity ceramic layer 30 is then completely enclosed by a layer of fine porosity ceramic except at the exit to center aperture 18 from which pure hydrogen is withdrawn, and facilitates deposition of a uniform, pore-free diffusion membrane on all surfaces of the disk 15.

Referring to FIGURES 3 and 3a a further embodiment of the present invention is illustrated, wherein there is provided a dense non-porous ceramic layer 40 at the surface of the disk 15 and adjacent to center aperture 18. The dense, non-porous ceramic layer, which is preformed and monolithically fired together with other ceramic parts of the element 15, serves a two-fold purpose. It has been found that uniform and pore-free metallic diffusion layers are difficult to produce in pore-free form at sharp edges and corners of the ceramic supports employed in the apparatus of this invention. Accordingly, the utilization of non-porous dense ceramic inserts at the edges of the porous ceramic eliminated the need for perfect diffusion coatings which will only pass $H_2$ and delimits the diffusion coating to a planar surface. Additionally, the non-porous, dense ceramic, which owes its non-porous properties to high glaze content, facilitates sealing of the ceramic disks to each other and to spacer elements (if such are provided) to form a leak-proof bore in the apparatus for withdrawal of pure diffused hydrogen.

Having in mind the aforementioned desideratum, FIGURES 4 and 4a show a further embodiment of disk 15 in accordance with the present invention. In this embodiment, a dense, non-porous ceramic layer 40 is provided adjacent the bore 18, and the rim 41 of the element 15 is likewise fabricated of dense non-porous ceramic. In this manner, thin palladium coatings need not be provided at the edges of the disk or, if provided for ease of manufacture, need not be absolutely pore-free.

Further, the provision of a dense ceramic rim on the element 15 provides a further advantage as shown in FIGURE 4 wherein gas passages 42 are provided in the dense ceramic rim 41. It will be appreciated that one of the problems in separating hydrogen by a process which is diffusion-controlled is to provide a flow of gas across the permeation surface. By employing a relatively close fitting container for the diffusion assembly and by incorporating gas passages in the non-porous portions of the disk 15, and alternating the position of such passages from disk to disk in the completed assembly, the flow of impure gas is readily directed across the diffusion surfaces, thus improving substantially the overall efficiency of the apparatus. Non-porous segments may of course be incorporated in any part of the element 15 for provision of such gas passages at locations other than the rim of the element 15.

The ceramic material of the body of the diffusion assembly 11 comprises generally from 50-90% by weight alkali aluminum silicates, 10-50% clay and from 0-10% silica. It has been found that the free silica content should not exceed 10% by weight of the ceramic mix to provide a fired ceramic of low thermal expansion and good resistance to shock.

In order to increase the strength of the final porous body and to broaden the firing temperature making the fired ceramic less likely to dust if slightly underfired, a ceramic glaze is added to the ceramic. The amount of glaze will vary from about 2 to 50% depending upon the desired porosity of the fired ceramic. The use of glaze in the ceramic has the further advantage of permitting a closer matching of the thermal expansion and firing shrinkage of non-porous and porous ceramics used in the fabrication of the diffusion apparatus. Various conventional high temperature ceramic glazes can be employed for this purpose. Satisfactory glazes generally consist of admixtures of alumina and silica containing various other oxide components, including, e.g., boria, calcium oxide, strontium oxide and the like, which components are incorporated in the glaze to provide specific thermal expansion and softening properties. Among the commercially available glazes which have been found satisfactory for the purposes set forth herein are Pemco P–1701, Corning 7056 and Ferro 3292. The nominal oxide composition of commercially available glazes which have been found suitable is given in the following table.

|  | Parts by Weight of | | |
| --- | --- | --- | --- |
|  | Glaze "A" | Glaze "B" | Glaze "C" |
|  | (1) | (2) | (3) |
| Ingredients as oxides: | | | |
| $Al_2O_3$ | 13.6 | 5.5 | 15.7 |
| $SiO_2$ | 44.9 | 70.6 | 51.3 |
| $B_2O_3$ | 35.4 | 45.1 | 29.0 |
| $K_2O$ | 3.5 | 19.3 | 7.5 |
| $Na_2O$ | 2.7 | 1.4 | 4.0 |
| CaO | 9.5 | 0.4 | 36.4 |
| SrO | 17.7 | 0.7 | 43.8 |
| Total | 127.3 | 143.0 | 187.7 |

The porosity of the porous ceramics is controlled by addition of varying amounts of filler materials which are removed by combustion during firing, e.g. wood powder, finely-divided plastics, carbon powder and the like. In the preparation of structures of fine porosity, from 25–45% by weight filler, e.g. carbon powder and 75–55% fine mesh ceramic power (ceramic+glaze) is used, while from 40–85% carbon powder is used to obtain coarse porosity. Combustible filler such as carbon powder is also added to ceramic mixtures intended to produce substantially impervious and dense ceramic for the purpose of adjusting the shrinkage of the dense ceramic to match that of the porous ceramic in contact with which it is fired.

In the fabrication of the ceramic disks or elements employed in the apparatus of the present invention, the particular components and their percentage in the mix may be varied to some extent and still produce thermal and structural properties which will be suitable for providing a ceramic support for a non-porous hydrogen-permeable membrane coated thereon. In practice, nepheline syenite has proved a particularly suitable alkali aluminum silicate, and the clay component is preferably made up of a mixture of kaolin, which is included for its purity, and ball clay, which provides plasticity and strong bonding power. In preparing the ceramic parts of the ceramic body, the silicate, clay and carbon, together with requisite amounts of glaze, are thoroughly mixed, and then glycerin or water mixed with a binder, such as polyvinyl alcohol, methyl cellulose, acrylic resin or polyethylene glycol, for example, is mixed in the dry materials and dried to form a precursor powder suitable for molding into the desired shape. An emulsion of microcrystalline wax has also proved to be a good binder and lubricant.

In molding the composite porous elements having distinct layers of different porosity, a first layer of the composite precursor ceramic material is first deposited in a mold. Such first layer, which is to be of fine porosity, is generally granulated to a mesh size of 25/140 preferably a mesh size of 28/80, that is, the precursor powder passes through a 25 mesh sieve (American Standard Sieve Size) and is retained on a 140-mesh sieve. Thereafter, an intermediate layer of coarse precursor ceramic material, having a granularity for example of 18/35 and preferably 20/28 mesh (100% passes 18 mesh and 100% retained on 35 mesh) is placed in the mold, and topped with a third layer of fine porosity ceramic material. The deposited layers are compacted under pressure of 1,000–10,000 p.s.i.g., typically 4,000 p.s.i.g., and then fired typically to cone 01. Generally, when fired to cone 01, the porous ceramic lacks strength, and when fired to cone 2, it is less porous and gas flow is reduced. It will be understood that the particular firing temperature will depend upon the composition of the particular ceramic formulation employed, but generally it has been found that slight under-firing, i.e. not firing to maximum density, provides a more effective balance of desired porosity and strength characteristics.

Where it is desired to incorporate areas of dense non-porous ceramic in the disk, as discussed hereinabove, it has been found that the use of green "pre-forms" insure uniformity and precise fit of the non-porous sections of the disk.

Green pre-forms comprise compacted unfired rings or sections of a precursor ceramic powder having a high glaze content and formulated to be non-porous on firing, but having shrinkage characteristics on firing compatible with the porous ceramic precursor powders employed in the fabrication of the porous ceramic disks. Such pre-forms can be of any shape and, as illustrated herein, have been employed in the form of rings.

Specific details of the preparation and application of hydrogen-permeable metal film to the ceramic elements employed in the apparatus of the invention need not be further discussed here, since these have been fully disclosed in U.S. Patent 3,344,586, and in U.S. application Ser. No. 465,999 of Robert C. Langley and Herbert Myers, filed June 22, 1965. The latter application discloses particularly effective palladium films on porous ceramic prepared by application of a slurry of powdered palladium and powdered glaze material in water which is thereafter fired to provide a glazed coating having particles of palladium dispersed throughout the coating.

Similarly, the method of assembly of ceramic elements or disks into a diffusion assembly is fully disclosed in U.S. Patent 3,344,586 incorporated herein by reference.

In the following examples, the following formulations were employed to fabricate composite disks in accordance with the present invention.

(1) "Ceramic Body" consisted of:

| | Percent |
|---|---|
| Nepheline syenite | 55 |
| Ball clay | 15 |
| Koalin | 25 |
| Silica | 5 |

(2) "Fine Ceramic Precursor Powder" consisted of a mixture of 63.3% by weight of ceramic body (1) above, 1.7% of 325 mesh Pemco 1701 glaze and 35% by weight carbon black, with granulation to 28–80 mesh after mixing.

(3) "Coarse Ceramic Precursor Powder" consisted of a mixture of 75% by weight carbon black, 24.4% of ceramic body (1), and 0.6% of 325 mesh Pemco 1701 glaze with granulation to 20–28 mesh.

(4) "Dense Ceramic Precursor Powder" consisted of a mixture of 12.5% 325 mesh glaze (Pimco 1701), 71.0% ceramic body (1) above, and 16.5% carbon black, the mixture being granulated to 28–80 mesh.

Each of the powders employed in the following examples was mixed with a water emulsion of microcrystalline wax containing about 50% wax (Mobilcer–R) in an amount to provide about 12% by weight (dry basis) wax to powder. The powders were dried at 200° F. to remove water prior to use.

EXAMPLE 1

A porous ceramic disk of about ⅛ inch thickness was prepared as follows.

In a mold (4" diameter) having a center pin (0.5" in diameter) layers were formed consisting of
 (i) A thin bottom layer about 20 mils thick of fine precursor ceramic powder (2) and binder.
 (ii) A thicker center layer about 100 mils thick of coarse precursor ceramic powder (3) and binder.
 (iii) A thin top layer about 20 mils thick of fine precursor ceramic powder (2) and binder.

The composite layers were then compacted in the mold at a pressure of 4,000 p.s.i.g., the unitary element removed from the mold and fired to cone 1.

Th resultant disk ⅛" thick and about 3.4" in diameter was found to permit an axial flow of nitrogen of 9 liters/minute/square inch at room temperature and 15 p.s.i.g. pressure. The radial flow of the disk was about 40 liters/minute.

EXAMPLE 2

A porous laminated ceramic disk having the configuration of FIGURE 2b was prepared using the method of Example 1 except that an upper layer of fine porosity precursor ceramic (2) was provided to obtain a raised hub of about 30 mils. This monolithic raised hub was made by machining a recess in the piston of the mold. The porous ceramic disk was coated with a thin Pd-glaze film as described in U.S. Patent 3,344,586. The coated ceramic disk was assembled with a metal conduit and flange as described in said patent, and at 500° C. withstood a differential pressure of 300 p.s.i.g. $N_2$. The coated disk under hydrogen pressure of 15 p.s.i. upstream and atmospheric pressure downstream passed 4 liters/minute of pure hydrogen.

EXAMPLE 3

A laminated ceramic disk was prepared as follows:

In a mold of 4-inch diameter having a center pin 0.5 inch diameter was placed a green "pre-form" ring of dense ceramic precursor powder (4). The ring was prepared by compacting the precursor powder at 1000 p.s.i.g. to produce a ring of 30 mils thickness and 1 inch diameter having a center hole of 0.5 inch diameter to fit over the center pin of the mold.

After placement of the green pre-form, a bottom layer of about 30 mils of fine precursor ceramic powder (2) was placed in the mold, and then a center layer of about 100 mils of coarse precursor ceramic powder was added. In this case, however, the coarse powder was placed only in the center of the mold cavity, extending to within about ¼ inch of the rim leaving an annular space which was filled with fine porosity precursor ceramic powder (2).

Finally, a second green "pre-form" ring of dense ceramic percursor powder was fitted over the center pin and a top layer of fine porority procursor ceramic powder about 30 mills thick was placed in the mold, and the contents compressed at 4000 p.s.i.g. Subsequent firing to cone 1 produced a ceramic disk of the configuration shown in FIGURE 3a except that the entire rim of the ceramic disk was of fine porosity.

At room temperature, the disk had an axial flow of 9 liters/minute/square inch using nitrogen at 15 p.s.i.g. The radial flow of the disk was about 40 liters/minute.

The disk was coated with a Pd=glaze film as in Example 2 and passed 4 liters/minute of pure hydrogen when tested at 500° C. and a pressure differential of 15 p.s.i. The ceramic disk also was found to withstand a differential pressure of 600 p.s.i.g. $N_2$ at room temperature before and after coating the disk with a Pd-glaze film. The uncoated disk was so tested by sealing it in a plastic envelope.

These results show that the monolithic laminated design achieves the goals of high ceramic strength without any compromise in radial flow, since the hydrogen flows realized have equalled or exceeded those obtained with cavity disks under the same conditions.

It will be understood that the procedure of Example 3 can readily be adapted to produce ceramic disks of the configuration shown in FIGURE 4. For example, instead of providing a rim of fine porosity precursor powder for the disk, a rim of dense ceramic precursor powder (4) may be employed to provide a rim section of the disk which is impervious to gas flow. Alternatively, such a rim may be prepared as a green pre-form, and inserted in the mold prior to addition of the fine and coarse ceramic precursor powders. Where desired, e.g. to produce a disk having gas-directing passages as shown in FIGURE 4, removable pins may be inserted in the dense ceramic section of the mold to provide, on firing, gas passages which will assist in distribution of the impure gas across the diffusion surfaces of the diffusion assembly. These and other modifications of the invention disclosed herein will be understood to be within the scope of the claims appended hereto.

What is claimed is:

1. In an apparatus for separating hydrogen from a mixture of gases containing hydrogen which apparatus comprises in combination (i) a chamber having an inlet and an outlet for the passage of a mixture of gases through the chamber (ii) a gas diffusion assembly in the chamber having a conduit for conducting separated gas from a central bore of the assembly to the outside of the chamber and wherein the diffusion assembly comprises a stack of thin elements of porous ceramic material arranged axially in spaced apart relationship to form a central bore in gas flow relationship with each element, and each of said elements is coated on its exterior surfaces with a non-porous film of material selectively permeable to hydrogen, the improvement wherein each of said elements consists of a composite porous element having inner and outer layers of different porosity adhered together, the outer of said layers being composed of fine grained fired ceramic and the inner of each of said layers being of coarse grained fired ceramic, each of said elements being further characterized by having a non-porous area of thickness of the element, and gas passages in said non-porous area to direct the flow of impure gases over the element face.

2. The improved apparatus of claim 1 wherein each of said elements is in the shape of a circular disk having an integral raised hub surrounding the central bore to act as a spacer.

3. The apparatus of claim 1 wherein said non-porous area consists of an annular outer rim of the element.

References Cited

UNITED STATES PATENTS

| 3,241,298 | 3/1966 | Pierce | 55—158 |
| 3,344,586 | 10/1967 | Langley et al. | 55—158 |
| 3,350,846 | 11/1967 | Makrides et al. | 55—158 |

REUBEN FRIEDMAN, Primary Examiner

C. N. HART, Assistant Examiner